United States Patent
Sakatani et al.

(10) Patent No.: US 8,298,979 B2
(45) Date of Patent: Oct. 30, 2012

(54) ZIRCONIUM OXALATE SOL

(75) Inventors: Yoshiaki Sakatani, Niihama (JP); Fumiyuki Takasaki, Osaka (JP)

(73) Assignee: Daiichi Kigenso Kagaku Kogyo Co., Ltd., Osaka (JP)

( * ) Notice: Subject to any disclaimer, the term of this patent is extended or adjusted under 35 U.S.C. 154(b) by 0 days.

(21) Appl. No.: 12/480,165

(22) Filed: Jun. 8, 2009

(65) Prior Publication Data
US 2009/0305878 A1 Dec. 10, 2009

(30) Foreign Application Priority Data
Jun. 9, 2008 (JP) ................... 2008-150243

(51) Int. Cl.
*B01J 21/08* (2006.01)

(52) U.S. Cl. ........ 502/170; 502/158; 502/236; 502/350; 502/242

(58) Field of Classification Search ................ 502/350, 502/170, 522; 106/287
See application file for complete search history.

(56) References Cited

U.S. PATENT DOCUMENTS

| | | | |
|---|---|---|---|
| 6,337,301 B1 * | 1/2002 | Ohmori et al. | 502/350 |
| 6,407,033 B1 * | 6/2002 | Kimura et al. | 502/350 |
| 6,479,141 B1 * | 11/2002 | Sanbayashi et al. | 428/323 |
| 7,045,005 B2 * | 5/2006 | Sakatani et al. | 106/287.17 |
| 2003/0220194 A1 * | 11/2003 | Sakatani et al. | 502/350 |
| 2005/0022908 A1 * | 2/2005 | Tounaka et al. | 148/248 |
| 2006/0020052 A1 | 1/2006 | Tsujimoto et al. | |
| 2009/0105354 A1 * | 4/2009 | Oswald et al. | 516/98 |

FOREIGN PATENT DOCUMENTS

| | | |
|---|---|---|
| EP | 0 866 101 A | 9/1998 |
| EP | 1 577 008 A | 9/2005 |
| JP | 9-328336 A | 12/1997 |
| JP | 11-209691 A | 8/1999 |
| JP | 2003-105262 A | 4/2003 |
| JP | 2004-59686 A | 2/2004 |
| JP | 2007-70212 A | 3/2007 |
| WO | 98/15600 A1 | 4/1998 |
| WO | 99/28393 A1 | 6/1999 |
| WO | 01/23483 A1 | 4/2001 |

OTHER PUBLICATIONS

Zhang C. et al.; "An Investigation into Repeptization of Zirconyl Oxalate Xerogels"; Journal of Non-Crystalline Solids; North-Holland Physics Publishing; Amsterdam, NL, vol. 351; No. 8-9, Apr. 1, 2005; pp. 784-787.

Vaidya, S. et al.; "Nanocrystalline Oxalate/Carbonate Precursors of Ce and Zr and their Decompositions to CeO2 and ZrO2 Nanoparticles"; J. Am. Ceram. Soc.; vol. 90; No. 3; 2007; pp. 863-869.

* cited by examiner

*Primary Examiner* — Melvin C Mayes
*Assistant Examiner* — Colette Nguyen
(74) *Attorney, Agent, or Firm* — Sughrue Mion, PLLC

(57) ABSTRACT

A sol of the present invention is a sol comprising zirconium oxalate compound as a dispersoid, wherein a mol ratio of oxalic acid to Zr (oxalic acid/Zr) is from 1.2 to 3 and a particle diameter D50 of the dispersoid is from 10 to 100 nm. This sol is produced by adding oxalic acid to a dispersion liquid of zirconium hydroxide, and the addition of oxalic acid is carried out in twice.

3 Claims, No Drawings

ZIRCONIUM OXALATE SOL

CROSS-REFERENCE TO RELATED APPLICATIONS

This Nonprovisional application claims priority under 35 U.S.C. §119(a) on Patent Application No. 2008-150243 filed in Japan on Jun. 9, 2008, the entire contents of which are hereby incorporated by reference.

BACKGROUND

1. Technical Field

The present invention relates to a zirconium oxalate sol.

2. Description of Related Art

A photocatalyst is a catalyst which exhibits an activity upon irradiation with light and is coated to a base material, together with a binder component, and used as a coat as disclosed in PCT International Publication No. WO98/15600, Japanese Patent Application Laid-Open No. 2003-105262, Japanese Patent Application Laid-Open No. 9-328336 (1997), Japanese Patent Application Laid-Open No. 2004-59686, PCT International Publication No. WO01/023483, Japanese Patent Application Laid-Open No. 11-209691 (1999) and PCT International Publication No. WO99/028393.

However, a coat formed from a conventional photocatalyst coating liquid has not necessarily a sufficient adhesion strength to a base material, and therefore it was necessary to increase a use amount of a binder component with respect to a photocatalyst in the coating liquid. When a large amount of the binder component is used, it becomes difficult for the photocatalyst to sufficiently exhibit the activity.

When a sol containing fine particles of a metal compound as a dispersoid is used as a binder, since the sol is excellent in dispersibility, it is easy to uniformly mix with a photocatalyst. Therefore, it can be expected that a structure of a film can be made uniform and strong binder ability is exhibited, and thus a coat of a photocatalyst with good quality is formed.

Among fine particles of the metal compound, fine zirconium compound particles have a property in which Zr atoms are easily polymerized via an OH group, and therefore it is considered that fine zirconium compound particles have high suitability for use as a binder of a photocatalyst coating liquid. A sol of a zirconium compound which is considered to have high suitability for use as a binder of a photocatalyst includes, for example, a sol disclosed in Japanese Patent Application Laid-Open No. 2007-70212, namely, a sol containing amorphous Zr—O-based particles having an average particle diameter of 10 nm as a dispersoid, the sol (pH 3.2) containing 0.4 gram equivalents of nitric acid with respect to 1 mol of Zr. It can be expected that this sol comprising Zr—O-based particles as a dispersoid has high suitability for use as a binder of a photocatalyst coating liquid since the dispersoid is amorphous and has an average particle diameter of 10 nm.

SUMMARY

However, it is hard to say that the sol disclosed in Japanese Patent Application Laid-Open No. 2007-70212 is most suited for use as a binder of a photocatalyst coating liquid.

In light of the problems described above, the present invention has been made and an object thereof is to provide a sol which functions as an excellent binder of a photocatalyst coating material.

Present inventors carried out earnest works about the problems described above, and thus the present invention has been completed. The present invention provides the following.

(1) A zirconium oxalate sol comprising zirconium oxalate compound as a dispersoid, wherein a mol ratio of oxalic acid to Zr (oxalic acid/Zr) is from 1.2 to 3 and a particle diameter D50 of the dispersoid is from 10 nm to 100 nm.

(2) A process for producing a zirconium oxalate sol, comprising adding oxalic acid to a dispersion liquid of zirconium hydroxide to produce the zirconium oxalate sol according to (1), wherein the addition of oxalic acid is carried out in twice.

(3) The process according to (2), wherein oxalic acid is added to the dispersion liquid of zirconium hydroxide so that a mol ratio of oxalic acid to Zr (oxalic acid/Zr) is to be from 0.8 to 1.0, the obtained mixture of zirconium hydroxide and oxalic acid is heated, oxalic acid is further added so that the mol ratio of oxalic acid to Zr (oxalic acid/Zr) is to be from 1.2 to 3.0, and the mixture is heated again.

(4) A photocatalyst coating liquid for forming a coat having a photocatalytic activity, comprising (i) a photocatalyst, (ii) zirconium oxalate compound, (iii) an amorphous Zr—O-based particles, (iv) a silicon alkoxide and (v) a solvent, wherein the photocatalyst (i) is a mixture of a titanium oxide photocatalyst particle and a tungsten oxide photocatalyst particle each surface being charged in the same polarity, or is a mixture of a titanium oxide photocatalyst particle where a surface is treated with a phosphoric acid (salt) and a tungsten oxide photocatalyst particle, and wherein content by amount of (ii) to (iv) is respectively 0.020 to 0.20 mass times, 0.020 to 0.40 mass times and 0.040 to 0.22 mass times in terms of an oxide ((ii) and (iii) are converted as $ZrO_2$, and (iv) is converted as $SiO_2$)) with respect to the total solid part of the photocatalyst (i).

(5) A process for producing a photocatalyst functional product, comprising coating the photocatalyst coating liquid according to (4) on a surface of a base material, and volatilizing a dispersion medium.

According to the zirconium oxalate sol of the present invention, the addition of a small amount of the zirconium oxalate sol as a binder component to a photocatalyst coating liquid enables formation of a coat, which exhibits a sufficient adhesion force, without inhibiting a function of the photocatalyst.

The above and further objects and features will more fully be apparent from the following detailed description with accompanying drawings.

DETAILED DESCRIPTION

In the present invention, the particle diameter D50 means a particle diameter at which a cumulative frequency in a volume equivalent particle size distribution is to be 50% when a particle diameter of a sol is measured by a laser Doppler method.

[Sol Containing Zirconium Oxalate Compound as Dispersoid]

The sol of the present invention contains zirconium oxalate compound as a dispersoid. There is no particular limitation on the mol ratio of oxalic acid to Zr (oxalic acid/Zr) of this zirconium oxalate compound, and examples of the zirconium oxalate compound include known compounds such as 95Zr-Zirconium oxalate (CAS. No. 50291-68-4), Zirconium oxalate (CAS. No. 14536-19-7), Zirconium oxide oxalate (CAS. No. 34156-70-2), $Zr(C_2O_4)_{0.69}(OH)_{2.69} \cdot xH_2O$ (CAS. No. 34156-70-2), $Zr(C_2O_4)_{0.8}(OH)_{2.4} \cdot 99H_2O$ (CAS. No. 34156-70-2), $Zr(OH)(HC_2O_4)_3 \cdot 7H_2O$ (CAS. No. 34156-70-2) and the like. The structure of zirconium oxalate compound as the dispersoid includes, for example, a structure in which oxalic acid ions are coordinated to Zr atoms polymerized via an OH group. As the evidence, the sol of the present invention has a negative zeta potential of about −20 mV at most. This reason is estimated that a polymer of Zr atoms is negatively charged by coordination of oxalic acid ions as anions.

Even if coordinated oxalic acid ions are completely desorbed, resulting in only a skeleton of a structure of Zr atoms polymerized via an OH group, it is possible to exert a function as a binder of a photocatalyst, and therefore the sol can contain those chemical species.

The particle diameter D50 of zirconium oxalate compound as the dispersoid is from 10 to 100 nm, and preferably from 10 to 80 nm. Such the particle diameter D50 is required so as to ensure a high visible light transmittance when formed into a photocatalyst coat, and to obtain a high adhesion and a high film strength as a result of homogenization of a photocatalyst coat achieved by adjusting to the same particle diameter as that of a photocatalyst. It is not preferred to blend sol containing zirconium oxalate compound having a particle diameter D50 of less than 10 nm as a dispersoid is blended in a photocatalyst coating liquid since zirconium oxalate compound is precipitated as a crystal during a process for formation of a coat to cause crystal growth, and thus the film may become heterogeneous. Also it is not preferred that the particle diameter is more than 100 nm since white scattering of visible light becomes severe to cause deterioration of a photocatalyst coat or appearance of the base material, and deterioration of denseness of a photocatalyst coat, and thus sufficient strength or sufficient adhesion cannot be obtained.

The sol of the present invention contains oxalic acid in a mol ratio of oxalic acid to Zr (oxalic acid/Zr) within a range from 1.2 to 3.0. It is considered that a part of oxalic acid is coordinated to Zr atoms polymerized via an OH group as described above. When the mol ratio is less than 1.2, a dispersoid is not homogeneously dispersed and the objective sol cannot be obtained. This reason is considered that a fixed amount or more of coordination of oxalic acid ions to Zr atoms in zirconium oxalate compound is required so that zirconium oxalate compound as the dispersoid has a negative surface potential enough to be dispersed. Since it is possible to control the zeta potential by a mol ratio of oxalic acid to Zr contained in the sol, the mol ratio of oxalic acid to Zr (oxalic acid/Zr) can be adjusted within a range from 1.2 to 3.0 according to the required zeta potential. The zeta potential decreases with an increase of the mol ratio of oxalic acid to Zr, and therefore an electrostatic repulsive force of zirconium oxalate compound as the dispersoid increases, and thus the effect of decreasing viscosity is obtained.

It is not preferred that the mol ratio of oxalic acid to Zr is more than 3.0 since a photocatalyst function may be hampered as a result of an increase in impurities of the photocatalyst coat.

As long as the particle diameter D50 of the sol is to be from 10 to 100 nm, and preferably from 10 to 80 nm, the dispersoid can be selected according to the applications. Usually, ethanol, methanol, and a mixture thereof are used.

The amount of impurity components other than zirconium and oxalic acid contained in the sol is preferably as small as possible. However, the sol can contain impurity components within the range which do not inhibit the functions of the photocatalyst and the photocatalyst coat.

The process for producing a sol containing zirconium oxalate compound as a dispersoid, the photocatalyst coating liquid containing zirconium oxalate compound as a component of a binder, and the process for producing a photocatalyst functional product coated with the photocatalyst coating liquid of the present invention will be described in detail below.

[Process for Producing Sol Containing Zirconium Oxalate Compound as Dispersoid]

The present invention is characterized in that oxalic acid is added to a dispersion liquid of zirconium hydroxide in twice. The zirconium hydroxide used in the present invention may be a commercial zirconium hydroxide, or zirconium hydroxide obtained by neutralizing an aqueous solution of zirconium oxychloride with a base such as sodium hydroxide and removing impurities through well washing. The concentration of impurities of zirconium hydroxide to be used is preferably 1% by weight or less as a relative concentration with respect to the concentration in terms of $ZrO_2$ of zirconium hydroxide. It is not preferred that the concentration is more than 1% by weight since the concentration of impurities in the sol increases and an adverse influence may be exerted on the photocatalyst coat.

Zirconium hydroxide is usually dispersible in water to give a dispersion liquid of zirconium hydroxide. The concentration in terms of $ZrO_2$ of this dispersion liquid is preferably from 5 to 15% by weight. It is not preferred that it is inefficient when the concentration is less than 5% by weight, whereas, it becomes difficult to control the particle diameter when the concentration is more than 15%.

Next, first addition of oxalic acid to the above dispersion liquid is carried out. As a supply source of oxalic acid, oxalic acid dihydrate is usually used in the form of powders, and a solution prepared by dissolving oxalic acid dihydrate in water can also be used.

The amount of oxalic acid to be added first is preferably from 0.8 to 1.0 in terms of a mol ratio of oxalic acid to Zr (oxalic acid/Zr). It is not preferred that the particle diameter D50 of the sol increases even when the mol ratio of oxalic acid to Zr is less than 0.8 and is also more than 1.0. The reason why the amount of oxalic acid in the first addition is limited within the above range and the particle diameter D50 of the sol increases without the above range is considered that a basic skeleton of zirconium oxalate compound serving as a dispersoid of the sol is formed by the first addition of oxalic acid. Namely, it is considered that the above-mentioned polymer of Zr atoms to which oxalic acid ions are coordinated via an OH group is formed after the first addition of oxalic acid, and the size is determined by the amount of the first addition of oxalic acid.

After the first addition of oxalic acid, the dispersion liquid of zirconium hydroxide is preferably heated. It is considered that the reaction capable of forming zirconium oxalate compound serving as the dispersoid occurs after the first addition of oxalic acid, as described above. However, production efficiency can be enhanced by increasing the reaction rate with heating. Heating can be carried out at 70 to 95° C. for about 10 to 30 minutes. When the reaction does not sufficiently proceed because of lack of heating, the particle diameter D50 of the finally obtained sol may increase.

After heating, the second addition of oxalic acid is carried out. In the second addition of oxalic acid, oxalic acid is added so that the mol ratio of oxalic acid to Zr (oxalic acid/Zr) in the sol is to be from 1.2 to 3.0. When oxalic acid is added so that the mol ratio of oxalic acid to Zr is to be 1.0 in the first addition of oxalic acid, oxalic acid can be added so that the mol ratio of oxalic acid to Zr is to be from 0.2 to 2.0 in the second addition of oxalic acid. By this second addition of oxalic acid, particles of zirconium oxalate compound serving finally as the dispersoid are completed from a basic skeleton of zirconium oxalate compound as the dispersoid formed after the first addition of oxalic acid. Namely, oxalic acid (the mol ratio of oxalic acid to Zr is at least 1.2) is required so as to produce particles of zirconium oxalate compound as the dispersoid of the sol and thus the sol of the present invention is completed. When the particle diameter D50 of the solution to which oxalic acid was added at the second time is from 10 to 100 nm as a result of the measurement, it is possible to judge that particles of zirconium oxalate compound as the dispersoid have been completed.

As described above, since the zeta potential of zirconium oxalate compound as the dispersoid is determined by the coordination number of oxalic acid ions to Zr atoms of zirconium oxalate compound, oxalic acid in the amount, which is more than that required to complete particles of zirconium oxalate compound serving finally as the dispersoid of the sol, can be added according to the required zeta potential.

After the second addition of oxalic acid, a heat treatment is preferably carried out. Heating can be carried out at 70 to 95° C. for about 10 to 30 minutes. By the heat treatment, completion of particles of zirconium oxalate compound as the dispersoid of the sol is promoted and the sol can be efficiently produced.

The photocatalyst coating liquid of the present invention will be described below.

The photocatalyst coating liquid of the present invention comprises (1) a photocatalyst, (2) zirconium oxalate compound, (3) amorphous Zr—O-based particles, (4) a silicon alkoxide and (5) a solvent, wherein the photocatalyst (1) includes titanium oxide photocatalyst particles and tungsten oxide photocatalyst particles each surface being charged in the same polarity, or titanium oxide photocatalyst particles surface-treated with a phosphoric acid (salt) and tungsten oxide photocatalyst particles, and wherein content by amount of (2) to (4) is respectively 0.020 mass times to 0.20 mass times, 0.020 to 0.40 mass times and 0.040 to 0.22 mass times in terms of an oxide ((2) and (3) are $ZrO_2$, and (4) is $SiO_2$)) with respect to the total solid part of (1).

In the photocatalyst of the present invention, since surfaces of the titanium oxide photocatalyst particles and the tungsten oxide photocatalyst particles dispersed in the dispersion medium are charged in the same polarity, or the titanium oxide particles are surface-treated with a phosphoric acid (salt), the titanium oxide photocatalyst particles and the tungsten oxide photocatalyst particles are not aggregated with each other and thus a solid-liquid phase separation does not occur. Since it is possible to coat on a base material without aggregating the titanium oxide photocatalyst particles and the tungsten oxide photocatalyst particles with each other, the photocatalyst coat formed by coating the photocatalyst coating liquid of the present invention has a high photocatalytic activity.

[Titanium Oxide Photocatalyst Particles]

The titanium oxide photocatalyst particles composing the photocatalyst coating liquid of the present invention are particle-like titanium oxide having a photocatalytic activity and, for example, meta-titanic acid particles or titanium dioxide ($TiO_2$) particles in which a crystal structure is an anatase type, brookite type or rutile type, or the like.

For example, the meta-titanic acid particles can be obtained by the following process 1.

Process 1: Process for hydrolyzing a titanyl sulfate aqueous solution with heating.

For example, the titanium dioxide particles can be obtained by any one process of the following processes 2-1 to 2-3.

Process 2-1: Process for adding a base to a titanyl sulfate or titanium chloride aqueous solution without heating so as to obtain a precipitate, and calcining the precipitate.

Process 2-2: Process for adding water, an acid aqueous solution, or a basic aqueous solution to a titanium alkoxide so as to obtain a precipitate, and calcining the precipitate.

Process 2-3: Process for calcining meta-titanic acid.

The titanium dioxide particles obtained by these processes 2-1 to 2-3 are titanium dioxide particles in which a crystal structure is an anatase type, brookite type or rutile type according to the calcining temperature and calcining time in the case of calcining.

The particle diameter of the titanium oxide photocatalyst particles is usually from 20 nm to 150 nm, and preferably from 40 nm to 100 nm, in terms of an average dispersed particle diameter from a view point of a photocatalytic activity.

The BET specific surface area of the titanium oxide photocatalyst particles is usually from 100 $m^2$/g to 500 $m^2$/g, and preferably from 300 $m^2$/g to 400 $m^2$/g, from a view point of a photocatalytic activity.

[Tungsten Oxide Photocatalyst Particles]

The tungsten oxide photocatalyst particles are particle-like tungsten oxide having a photocatalytic activity and are, for example, tungsten trioxide ($WO_3$) particles. For example, the tungsten trioxide particles can be obtained by adding an acid to a tungstate aqueous solution so as to obtain tungstic acid as a precipitate, and calcining the tungstic acid. The tungsten trioxide particles can also be obtained by thermally decomposing ammonium metatungstate or ammonium paratungstate with heating.

The particle diameter of the tungsten oxide photocatalyst particles is usually from 50 nm to 200 nm, and preferably from 80 nm to 130 nm, in terms of an average dispersed particle diameter from a view point of a photocatalytic activity.

The BET specific surface area of the tungsten oxide photocatalyst particles is usually from 5 $m^2$/g to 100 $m^2$/g, and preferably from 20 $m^2$/g to 50 $m^2$/g, from a view point of a photocatalytic activity.

The use amount ratio of the titanium oxide photocatalyst particles to the tungsten oxide photocatalyst particles is, at mass ratio, usually from 4:1 to 1:8, and preferably from 2:3 to 3:2.

[Electrification of Surface]

In the photocatalyst coating liquid of the present invention, the surfaces of the titanium oxide photocatalyst particles and the tungsten oxide photocatalyst particles are charged in the same polarity. More particularly, both the surfaces are charged positively or negatively.

The surfaces of the meta-titanic acid particles obtained by the above-described process 1 and the titanium dioxide particles obtained by the above-described processes 2-1 to 2-3 are usually charged positively.

On the other hand, as for the tungsten oxide particles obtained by the process for adding an acid to a tungstate aqueous solution so as to obtain tungstic acid as a precipitate and calcining the tungstic acid, and the tungsten oxide particles obtained by thermally decomposing ammonium metatungstate or ammonium paratungstate with heating, the surfaces of these particles are charged negatively. Therefore, when the titanium oxide photocatalyst particles having the positively charged surfaces and tungsten oxide photocatalyst particles having the negatively charged surfaces are used, for example, the surfaces of the titanium oxide photocatalyst particles are charged negatively so as to be used in the photocatalyst coating liquid of the present invention.

In order to negatively charge the positively charged surfaces of the titanium oxide photocatalyst particles, the titanium oxide photocatalyst particles can be dispersed in a solution in which a surface treatment agent which can negatively charge the surfaces of the titanium oxide photocatalyst particles is dissolved in the dispersion medium. As for such the surface treatment agent, for example, polycarboxylic acid such as dicarboxylic acid or tricarboxylic acid can be used. For example, oxalic acid or the like can be used as the dicarboxylic acid, and citric acid or the like can be used as the tricarboxylic acid. A free acid or a salt can be used as polycarboxylic acid and phosphoric acid. As for a salt, for example, an ammonium salt or the like can be used. As for the surface treatment agent, oxalic acid, ammonium oxalate or the like can be used preferably.

The use amount of the surface treatment agent is usually 0.001 mol times or more, preferably 0.02 mol times or more, so as to sufficiently charge the surfaces of the titanium oxide photocatalyst particles in terms of $TiO_2$. The use amount of the surface treatment agent is generally 0.5 mol times or less, preferably 0.3 mol times or less, from the view point of economical efficiency.

By dispersing the titanium oxide photocatalyst particles having the positively charged surfaces in the solution in which the surface treatment agent is dissolved with the dispersion medium, the surface treatment agent dissolved in the surface treatment solution is adsorbed on the surfaces of the titanium oxide photocatalyst particles, and thereby the surfaces can be charged negatively.

The electrifications of surfaces of the titanium oxide photocatalyst particles and the tungsten oxide photocatalyst particles can be measured by a zeta potential at the time of respectively dispersing the particles in a solvent. As for the solvent used for measuring the zeta potential, a sodium chloride aqueous solution (having a sodium chloride concentration of 0.01 mol/L), which is added with hydrochloric acid to have a hydrogen ion concentration having pH 3.0, is used. The use amount of the solvent is generally 10,000 mass times to 1,000,000 mass times with respect to the titanium oxide photocatalyst particles or tungsten oxide photocatalyst particles.

[Phosphoric Acid (Salt)]

The photocatalyst coating liquid of the present invention contains a phosphoric acid (salt) and the phosphoric acid (salt) exists near the surfaces of titanium oxide photocatalyst particles. Examples of the phosphoric acid (salt) include phosphoric acid, or its ammonium salt, sodium salt, potassium salt, and the like. Among these, ammonium phosphates such as ammonium dihydrogen phosphate, diammonium hydrogenphosphate, and the like are particularly preferred. The phosphoric acids (salts) can be used independently or by mixing two or more kinds.

In the photocatalyst coating liquid of the present invention, the content by amount of the phosphoric acid (salt) is from 0.001 mol times to 0.2 mol times, and preferably 0.01 mol times or more and 0.1 mol times or less, with respect to the titanium oxide particles. When the content by amount of the phosphoric acid (salt) is less than 0.001 mol times, it is impossible to sufficiently suppress the aggregation of particles in the dispersion liquid. In contrast, since the effect corresponding to the amount cannot be exerted even when the content by amount of the phosphoric acid (salt) is more than 0.2 mol times, it becomes economically disadvantageous.

[Zirconium Oxalate Compound]

The photocatalyst coating liquid of the present invention contains zirconium oxalate compound. The use amount of zirconium oxalate compound is from 0.020 mass times to 0.20 mass times in terms of zirconium oxide ($ZrO_2$) with respect to the total use amount of the titanium oxide photocatalyst particles and the tungsten oxide photocatalyst particles. It is preferred to use zirconium oxalate compound in which the mol ratio of oxalic acid to Zr (oxalic acid/Zr) is from 1.2 to 3.0.

[Amorphous Zr—O-Based Particles]

The photocatalyst coating liquid of the present invention contains amorphous Zr—O-based particles. As for the amorphous Zr—O-based particles, for example, a commercial sol (produced by Daiichi Kigenso Kagaku Kogyo Co., Ltd. under the trade name of ZSL-10T) can be used. The content by amount of the amorphous Zr—O-based particles is from 0.020 mass times to 0.40 mass times in terms of zirconium oxide ($ZrO_2$) with respect to the titanium oxide photocatalyst particles and the tungsten oxide photocatalyst particles.

[Silicon Alkoxide]

The photocatalyst coating liquid of the present invention contains a silicon alkoxide and examples of the silicon alkoxide include tetraethoxysilane (ethyl silicate), methyl silicate (tetramethoxysilane), methyltriethoxysilane, and a hydrolysis-condensation product of a silicon alkoxide. The content by amount of the silicon alkoxide is from 0.040 mass times to 0.22 mass times in terms of silicon oxide ($SiO_2$) with respect to the titanium oxide photocatalyst particles and the tungsten oxide photocatalyst particles.

[Dispersion Medium]

As for the dispersion medium, a water medium mainly containing water is used. More particularly, a medium containing a use amount of water equal to or greater than 50% by mass is used. Water can be used independently, or a mixed solvent of water and a water-soluble organic solvent can be used. As for the water-soluble organic solvent, for example, a water-soluble alcoholic solvent such as methanol, ethanol, propanol or butanol, acetone, methyl ethyl ketone, and the like can be used.

A use amount of the dispersion medium is usually from 5 mass times to 200 mass times, preferably from 10 mass times to 100 mass times, with respect to a total amount of the titanium oxide photocatalyst particles, the tungsten oxide photocatalyst particles, zirconium oxalate compound and the silicon alkoxide in terms of the oxide. When the use amount of the dispersion medium is less than 5 mass times, the titanium oxide photocatalyst particles, the tungsten oxide photocatalyst particles and zirconium oxalate compound are precipitated easily. When the use amount is more than 200 mass times, there is disadvantageous in the view point of volume efficiency.

The photocatalyst coating liquid of the present invention is used after diluting with water or a solvent so that the content by amount of a solid part obtained by volatilizing a volatile component from the coating liquid was to be usually from about 0.5% by weight to 30% by weight, preferably from about 1% by weight to 20% by weight, and more preferably from about 2% by weight to 10% by weight. When the content by amount of the solid parts is less than 0.5% by weight, it becomes difficult to form a coat having a sufficient thickness. In contrast, when the content by amount of the solid parts is more than 30% by weight, transparency of the obtained coat easily deteriorates.

For example, the photocatalyst coating liquid of the present invention can be produced by a process of mixing a photocatalyst dispersion liquid containing a photocatalyst alone dispersed in a solvent with a binder liquid comprising zirconium oxalate compound, amorphous Zr—O-based particles and silicon alkoxide.

[Photocatalyst Dispersion Liquid]

The hydrogen ion concentration of the photocatalyst dispersion liquid of the present invention is usually from pH 0.5 to pH 8.0, and preferably from pH 1.0 to pH 7.0. When the hydrogen ion concentration has pH of smaller than 0.5, acidity is too strong, and thus the liquid is hardly handled. When the hydrogen ion concentration has pH of greater than 8.0, the tungsten oxide photocatalyst particles may be dissolved. The hydrogen ion concentration of the photocatalyst dispersion liquid can be generally adjusted by adding an acid. As for the acid, for example, nitric acid, hydrochloric acid, sulfuric acid, phosphoric acid, formic acid, acetic acid, oxalic acid, or the like can be used.

[Producing of a Photocatalyst Dispersion Liquid]

When the photocatalyst dispersion liquid used in the present invention comprises titanium oxide photocatalyst particles and tungsten oxide photocatalyst particles each surface being charged in the same polarity, for example, the photocatalyst dispersion liquid used in the present invention can be obtained by dispersing the titanium oxide photocatalyst particles having the positively charged surfaces in the solution in which the surface treatment agent is dissolved with the dispersion medium, and mixing the particles with the tungsten oxide photocatalyst particles having the negatively charged surfaces.

When the photocatalyst dispersion liquid used in the present invention contains titanium oxide particles and tungsten oxide particles and a phosphoric acid (salt), for example, the photocatalyst dispersion liquid used in the present invention can be obtained by dispersing the titanium oxide photocatalyst particles in the solution in which the phosphoric acid (salt) is dissolved with the dispersion medium, and mixing the particles with the tungsten oxide photocatalyst particles.

For example, the dispersion treatment can be carried out by a general method using a medium stirring dispersion machine. Although the tungsten oxide photocatalyst particles can be mixed as they are, these particles are usually mixed in a state of being dispersed in the dispersion medium, and preferably mixed after subjecting to a dispersion treatment.

[Electron-Withdrawing Substance or its Precursor]

The photocatalyst coating liquid of the present invention can contain an electron-withdrawing substance capable of exert electron-withdrawing property by supporting on the surface of the photocatalyst, or its precursor. The photocatalytic activity can be more increased by supporting the electron-withdrawing substance on the surface of the photocatalyst and thereby suppressing the recombination of electrons and positive holes, where the electrons are excited at the conduction band and the positive holes are generated at the valence band by irradiation of light.

As for such the electron-withdrawing substance, for example, metals such as Cu, Pt, Au, Pd, Ag, Fe, Nb, Ru, Ir, Rh, Co and the like, and preferably Cu, Pt, Au, Pd can be used. Also, oxides and hydroxides of these metals are exemplified.

The precursor of the electron-withdrawing substance is a compound that can convert to an electron-withdrawing substance on the surface of a photocatalyst. For example, such the precursor is nitrate, sulfate, halide, an organic acid salt, carbonate, phosphate or the like of the above-described metal. More particularly, for example, as for a precursor of copper, copper nitrate ($Cu(NO_3)_2$), copper sulfate ($Cu(SO_4)$), copper chloride ($CuCl_2$, $CuCl$), copper bromide ($CuBr_2$, $CuBr$), copper iodide ($CuI$), copper iodate ($CuI_2O_6$), copper ammonium chloride ($Cu(NH_4)_2Cl_4$), copper oxychloride ($Cu_2Cl(OH)_3$), copper acetate ($CH_3COOCu$, $(CH_3COO)_2Cu$), copper formate (($HCOO)_2Cu$), copper carbonate ($CuCO_3$), copper oxalate ($CuC_2O_4$), copper citrate ($Cu_2C_6H_4O_7$), copper phosphate ($CuPO_4$), or the like, can be used. As for a precursor of platinum, platinum chloride ($PtCl_2$, $PtCl_4$), platinum bromide ($PtBr_2$, $PtBr_4$), platinum iodide ($PtI_2$, $PtI_4$), potassium platinum chloride ($K_2(PtCl_4)$), hexachloroplatinic acid ($H_2PtCl_6$), platinum sulfite ($H_3(Pt(SO_3)_2OH)$), platinum oxide ($PtO_2$), tetraammine platinum chloride ($Pt(NH_3)_4Cl_2$), tetraammine platinum hydrogencarbonate ($C_2H_{14}N_4O_6Pt$), tetraammine platinum hydrogenphosphate ($Pt(NH_3)_4HPO_4$), tetraammine platinum hydroxide ($Pt(NH_3)_4(OH)_2$), tetraammine platinum nitrate ($Pt(NO_3)_2(NH_3)_4$), tetraammine platinum tetrachloroplatinum (($Pt(NH_3)_4)(PtCl_4)$), dinitro diammine platinum ($Pt(NO_2)_2(NH_3)_2$), or the like, can be used. As for a precursor of Au, gold chloride ($AuCl$), gold bromide ($AuBr$), gold iodide ($AuI$), gold hydroxide, ($Au(OH)_2$), tetrachlorochloroauric acid ($HAuCl_4$), potassium tetrachlorochloroaurate ($KAuCl_4$), potassium tetrabromochloroaurate ($KAuBr_4$), gold oxide ($Au_2O_3$), or the like, can be used. As for a precursor of palladium, palladium acetate (($CH_3COO)_2Pd$), palladium chloride ($PdCl_2$), palladium bromide ($PdBr_2$), palladium iodide ($PdI_2$), palladium hydroxide ($Pd(OH)_2$), palladium nitrate ($Pd(NO_3)_2$), palladium oxide ($PdO$), palladium sulfate ($PdSO_4$), potassium tetrachloropalladium acid ($K_2(PdCl_4)$), potassium tetrabromopalladium acid ($K_2(PdBr_4)$), tetraamminepalladium nitrate ($Pd(NH_3)_4(NO_3)_2$), tetraamminepalladium chloride ($Pd(NH_3)_4Cl_2$), tetraamminepalladium bromide ($Pd(NH_3)_4Br_2$), tetraammine palladium tetrachloropalladate (($Pd(NH_3)_4)(PdCl_4)$), ammonium tetrachloropalladate (($NH_4)_2PdCl_4$)), or the like, can be used.

These electron-withdrawing substances or these precursors can be used independently or by mixing two or more kinds. When the electron-withdrawing substance or its precursor is used, the use amount is generally from 0.005 parts by mass to 0.6 parts by mass, preferably from 0.01 parts by mass to 0.4 parts by mass, in terms of the metal atom with respect to the total amount of 100 parts by mass of the photocatalyst particles. When the use amount is less than 0.005 parts by mass, the photocatalytic activity by the use of the electron-withdrawing substance is not sufficiently improved. When the use amount is more than 0.6 parts by mass, the photocatalytic activity is to be insufficient easily.

For example, the photocatalyst coating liquid containing the electron-withdrawing substance or its precursor can be obtained by the similar process to that described above, that is, mixing the photocatalyst dispersion liquid, and adding the electron-withdrawing substance or its precursor to the mixture. When the precursor is added, light-irradiation can be carried out after the addition. A light to be irradiated is a visible radiation or an ultraviolet radiation. By carrying out the light-irradiation, the precursor can be converted to the electron-withdrawing substance. When light having the light-excitable wavelength of the photocatalyst is irradiated, electrons are generated by the light excitation so as to reduce the precursor, and then the precursor is supported by the surfaces of the photocatalyst particles as the electron-withdrawing substance.

[Additives]

The photocatalyst coating liquid of the present invention can contain additives within the range not impairing dispersibility of the titanium oxide photocatalyst particles and the tungsten oxide photocatalyst particles.

As for the additive, for example, a material added for improving the photocatalytic activity can be used. Specific examples of the material include a silicon compound such as silica sol, water glass or the like, an aluminum compound such as amorphous alumina, alumina sol, an aluminum hydroxide or the like, an aluminosilicate such as zeolite, kaolinite or the like, an alkali earth metal oxide or an alkali earth metal hydroxide such as magnesium oxide, calcium oxide, strontium oxide, barium oxide, magnesium hydroxide, calcium hydroxide, strontium hydroxide, barium hydroxide or the like, calcium phosphate, molecular sieve, active carbon, a polycondensation product of an organopolysiloxane compound, phosphate, a fluorine-based polymer, a silicon-based polymer, an acrylic resin, a polyester resin, a melamine resin, an urethane resin, an alkyd resin, or the like. These additives can be used independently or by mixing two or more kinds.

For example, photocatalyst coating liquid containing these additives can be obtained by mixing a photocatalyst, zirconium oxalate compound, amorphous Zr—O-based particles, a silicon alkoxide and a solvent and adding additives to the mixture.

[Formation of Photocatalyst Layer]

A photocatalyst functional product can be produced by coating the photocatalyst coating liquid of the present invention on the surface of a base material, and volatilizing the dispersion medium, where the product has a photocatalyst layer, on the surface of the base material, containing the photocatalyst particles so as to indicate a photocatalytic activity.

When the photocatalyst coating liquid contains the electron-withdrawing substance or its precursor, the electron-withdrawing substance or its precursor is supported by the surface of photocatalyst particles. When the precursor is used, the supported precursor is converted to the electron-withdrawing substance after supporting.

The photocatalyst functional product generally holds the photocatalyst on the surface with the strength that can be equal to practical use. As for the shape and size of the photocatalyst used in this case, various kinds of shapes such as a particle, fiber, a thin piece and the like can be applied and a size can be properly selected corresponding to an application and surface property. Further, when the photocatalyst is formed as a film on the surface of the photocatalyst functional product, the film thickness can be properly selected and formed to be several hundred nm to several mm. The photocatalyst is preferably held on the surface to which a visible radiation is irradiated and which is continuously or intermittently, and spatially connected with a part generating a malodorous substance, among the inner surface and outer surface of the photocatalyst functional product made of a material such as plastics, a metal, ceramics, wood, concrete or paper.

[Photocatalyst Functional Products]

Specific examples of the photocatalyst functional product include materials for buildings (a ceiling material, a tile, glass, a wall paper, a wall material, a floor, etc.), interior materials for cars (an instrument panel for cars, a sheet for cars, a ceiling material for cars, etc.), and textile products (clothing, curtain, etc.).

The photocatalyst functional product has high photocatalytic activity by light irradiation from a visible radiation source such as a fluorescent light or a sodium lamp. When the photocatalyst functional product is provided in an interior living environment with lighting, the concentrations of volatile organic substances such as toluene, formaldehyde and acetaldehyde, and malodorous can be reduced by light irradiation from indoor lighting, and also pathogenic bacteria such as *staphylococcus aureus, coliform bacillus*, or the like could be killed.

EXAMPLES

The present invention will be described in detail below with examples, but the present invention is not limited to these examples.

Note that, a measuring method in each example is as follows.

1. Particle Diameter D50 (Sol of Amorphous Zr—O-Based Particles)

Using a particle size distribution measuring apparatus (produced by NIKKISO CO., LTD. under the trade name of "UPA150"), a particle diameter, at which a cumulative frequency in a volume equivalent particle size distribution of a sol is to be 50%, was measured.

2. Zeta Potential (Sol of Amorphous Zr—O-Based Particles)

Using a zeta potential meter (produced by Otsuka Electronics Co., Ltd. under the trade name of "ELS-Z2"), a zeta potential of a sol was measured.

3. BET Specific Surface Area

A BET specific surface area of titanium oxide photocatalyst particles and tungsten oxide photocatalyst particles was measured by a nitrogen adsorbing method using a specific surface area measuring apparatus ("MONOSORB" produced by Yuasa Ionics Inc.).

4. Average Dispersed Particle Diameter (nm) (Photocatalyst Dispersion Liquid)

A particle size distribution of a sample was measured using a submicron particle size distribution measuring apparatus ("N4 Plus" produced by Beckman Coulter, Inc.), and automatically analyzed with a monodispersion mode by a software attached to this apparatus. The result was made to be an average dispersed particle diameter.

5. Crystal Structure

An X-ray diffraction spectrum was measured using an X-ray diffraction apparatus ("RINT 2000/PC" produced by Rigaku Corporation), and a crystal structure was determined from the spectrum.

6. Zeta Potential (Photocatalyst)

Titanium oxide photocatalyst particles or tungsten oxide photocatalyst particles were dispersed in a sodium chloride aqueous solution (having a sodium chloride concentration of 0.01 mol/L) in which a hydrogen ion concentration was adjusted to have pH value of 3.0 by adding hydrogen chloride, and the zeta potential of the solution was measured using a laser zeta potential meter ("ELS-6000" produced by Otsuka Electronics Co., Ltd.). A use amount of the sodium chloride aqueous solution was 250,000 mass times with respect to a use amount of the titanium oxide photocatalyst particles or the tungsten oxide photocatalyst particles. When the zeta potential was positive, the surface of the photocatalyst was charged positively, and when the zeta potential was negative, the surface was charged negatively.

7. Abrasion Resistance Test

As for an abrasion resistance test for a base material, a laminate obtained by laminating 12 cheese cloths (produced by Summers) was fixed to an eraser abrasion testing machine (produced by Sanko Seisakusho Co., Ltd.) and, after rubbing a glass base material coated with a sample (10 reciprocations), a state of a coat was visually evaluated according to the following 5-rank criteria.

A: No scratch line is formed on a coat.
B: 1-9 scratch lines are formed on a coat.
BC: 10-19 slight scratch lines are formed on a coat.
C: 10-19 scratch lines are formed on a coat.
D: 20-30 scratch lines are formed on a coat.
E: 30 or more scratch lines are formed on a coat.

8. Photocatalytic Activity

[Measurement of Acetaldehyde Decomposing Ability]

A photocatalytic activity was evaluated by measuring a first-order rate constant in decomposition reaction of acetaldehyde under irradiation of light from a fluorescent light. First, a samole for the measurement of a photocatalytic activity was made. The photocatalytic coating liquid obtained wad dropped in a glass petri dish (having an outer diameter of 70 mm, an inner diameter of 66 mm, a height of 14 mm, and a capacity of about 48 mL) so that the dropping amount in terms of the solid part per an unit area of a bottom face was to be 1 g/m² and the dropped liquid wad developed so as to be uniform on the whole bottom face of the petri dish. Then, a photocatalyst layer was formed on the bottom face of the glass petri dish by drying the liquid for 1 hour under an atmosphere in a dryer at 110° C. A sample for the measurement of a photocatalytic activity was obtained by irradiating an ultraviolet light from a black light to the photocatalyst layer for 16 hours so as to have the ultraviolet light strength of 2 mW/cm². The decomposing reaction of acetaldehyde was carried out by taking the obtained sample for the measurement of a photocatalytic activity into a gas bag (having an inner capacity of 1 L), sealing the bag, making the inside of the gas bag to be a vacuum state, enclosing a mixed gas of 600 mL in which a volume ratio of oxygen to nitrogen was 1:4 in the gas bag, enclosing a nitrogen gas of 3 mL containing acetaldehyde by 1 volume % in the gas bag, keeping it in a dark space at a room temperature for 1 hour, and setting the gas bag so that an illuminance near the measuring sample from a commercial white fluorescent light as a light source was to be 1,000 lux (measured by an illuminometer "T-10" produced by Konica Minolta Holdings, Inc.). The strength of an ultraviolet light near the measuring sample was 6.5 µW/cm² (measured by using an ultraviolet intensity meter "UVR-2" produced by Topcon Corporation in which a light receiving part "UD-36" produced by the same corporation was attached to the meter). The gas in the gas bag was sampled every 1.5 hours after irradiating a fluorescent light, the residual concentration of acetaldehyde was measured by a gas chromatograph ("GC-14A" produced by Shimadzu Corporation) so as to calculate a first-order rate constant from the acetaldehyde concentration with respect to the irradiation time. The calculated first-order rate constant was to be an acetaldehyde decomposing ability. When the first-order rate constant is greater, the acetaldehyde decomposing ability is greater.

Reference Example 1

Preparing of Titanium Oxide Photocatalyst Particles and its Dispersion Liquid

As the titanium oxide photocatalyst particles, meta-titanic acid cake (containing a titanium component of 42 mass % in terms of $TiO_2$) obtained by hydrolyzing a titanyl sulfate aqueous solution, followed by filtration was used.

An oxalic acid aqueous solution was obtained by dissolving 2.70 g of oxalic acid (produced by Wako Pure Chemical Industries, Ltd.) with 60.2 g of water. A mixture was obtained by adding 57.1 g of the meta-titanic acid cake to the oxalic acid aqueous solution, followed by mixing. The use amount of oxalic acid in this mixture was 0.1 mol with respect to 1 mol of meta-titanic acid. A titanium oxide photocatalyst dispersion liquid was obtained by subjecting the mixture to a dispersion treatment under the following conditions using a medium stirring type dispersing device ("4TSG-1/8" produced by Aimex Co., Ltd.).

Dispersion medium: Beads made of zirconia having an outer diameter of 0.05 mm
Treating temperature: 20° C.
Treating time: 3 hours
Rotating rate: 2,000 rpm The average dispersed particle diameter of the obtained titanium oxide photocatalyst particles in the titanium oxide photocatalyst dispersion liquid was 85 nm. The hydrogen ion concentration had a pH value of 1.6. A solid part was obtained by vacuum-drying a part of this titanium oxide photocatalyst dispersion liquid, and the BET specific surface area of this solid part was 325 m²/g. The crystal structure of the solid part of the titanium oxide photocatalyst dispersion liquid was anatase. In addition, when the X-ray diffraction spectra of the mixture before the dispersing treatment and the solid part of the titanium oxide photocatalyst dispersion liquid after the dispersing treatment were measured and compared, the change of the crystal structure due to the dispersing treatment was not observed. The zeta potential of the titanium oxide photocatalyst particles in the titanium oxide photocatalyst dispersion liquid was −19.9 mV.

Reference Example 2

Preparing of Tungsten Oxide Photocatalyst Particles and its Dispersion Liquid

A mixture was obtained by adding 1 kg of a tungsten oxide powder (having a purity of 99.99%, produced by Kojundo Chemical Laboratory Co., Ltd.) to 4 kg of ion-exchanged water, followed by mixing. A tungsten oxide photocatalyst dispersion liquid was obtained by subjecting the mixture to a dispersing treatment under the following conditions using a medium stirring type dispersing device ("ULTRA APEX MILL UAM-1", produced by Kotobuki Engineering & Manufacturing Co., Ltd.).

Dispersion medium: 1.85 kg beads made of zirconia having an outer diameter of 0.05 mm
Stirring rate: 12.6 m/sec. at a circumferential speed
Flowing rate: 0.25 L/min
Treating time: A total of about 50 minutes The average dispersed particle diameter of the obtained tungsten oxide photocatalyst particles in the tungsten oxide photocatalyst dispersion liquid was 96 nm. The hydrogen ion concentration had a pH value of 2.2. A solid part was obtained by vacuum-drying a part of this dispersion liquid, and the BET specific surface area of this solid part was 37 m²/g. In addition, when the X-ray diffraction spectra of the mixture before the dispersing treatment and the solid part of the tungsten oxide photocatalyst dispersion liquid after the dispersing treatment were measured and compared, both the crystal structures were $WO_3$, and the change of the crystal structure due to the dispersing treatment was not observed. The zeta potential of the tungsten oxide photocatalyst particles in the tungsten oxide photocatalyst dispersion liquid was −25.5 mV.

Example 1

Preparing of Zirconium Oxalate Sol

A dispersion liquid was prepared by adding 100 g (31 g in terms of $ZrO_2$) of zirconium hydroxide to 100 g of water, followed by well stirring. Next, as a first addition of oxalic acid, 31.7 g (a mol ratio of oxalic acid to Zr=1.0) of oxalic acid dihydrate was added to the dispersion liquid, followed by heating at 90° C. for 15 minutes. Next, as a second addition of oxalic acid, 15.8 g (a mol ratio of oxalic acid to Zr=0.5) of oxalic acid dihydrate was added to the dispersion liquid, followed by heating at 90° C. for 15 minutes to obtain a sol. When diluted to 0.5% by weight in terms of $ZrO_2$, the zeta potential of the sol was −61 mV and the particle diameter D50 was 65 nm.

Example 2

Preparing of Zirconium Oxalate Sol

A sol (100 g) was obtained by adding 500 g of water to 100 g (about 12 g in terms of $ZrO_2$) of the sol obtained in Example 1 and repeating the operation of carrying out ultrafiltration using an ultrafilter (molecular weight cut off: 6000) until 500 g of a dispersion medium is removed four times. The mol ratio of oxalic acid to Zr in the sol calculated from the concentration of oxalic acid of the dispersion medium removed by ultrafiltration was 1.3. When diluted to 0.5% by weight in terms of $ZrO_2$, the zeta potential of the sol was −48 mV and the particle diameter D50 was 70 nm.

Example 3

Preparing of Photocatalyst Dispersion Liquid

The titanium oxide photocatalyst dispersion liquid obtained in Reference Example 1 and the tungsten oxide photocatalyst dispersion liquid obtained in Reference Example 2 were mixed so that the use amount ratio of the titanium oxide photocatalyst particles to the tungsten oxide photocatalyst particles was to be 1:1 (at mass ratio) and the total amount of the titanium oxide photocatalyst particles and the tungsten oxide photocatalyst particles was to be 5% by weight with respect to the dispersion liquid. A solid-liquid separation was not observed in this photocatalyst dispersion liquid.

[Preparing of Photocatalyst Coating Liquid]

Zirconium oxalate sol (0.067 g, having a concentration of 11.2% by weight in terms of $ZrO_2$) obtained in Example 2 was dispersed in 0.815 g of water and 0.214 g of a dispersion liquid of amorphous Zr—O-based particles (produced by Daiichi Kigenso Kagaku Kogyo Co., Ltd. under the trade name of ZSL-10T, having a concentration of 10.5% by weight in terms of $ZrO_2$) was added thereto. Next, 0.104 g of high-purity ethyl ortho-silicate (produced by Tama Chemicals Co., Ltd.) was added. To the binder thus obtained, 4.8 g of the above photocatalyst dispersion liquid (having a concentration of 5% by weight) was added to obtain a photocatalyst coating liquid. With respect to the total amount of the titanium oxide photocatalyst particles and the tungsten oxide photocatalyst particles, the amounts of zirconium oxalate compound, amorphous Zr—O-based particles and ethyl silicate were respectively 0.031 mass times, 0.094 mass times and 0.13 mass times, in terms of the oxide.

The photocatalyst coating liquid obtained above was coated on a sufficiently degreased slide glass and the excess dispersion liquid was removed by rotating at 300 rpm for 3 minutes using a spin coater (produced by Mikasa Co., Ltd. under the trade name of "1H-D7"). This glass plate was dried at 110° C. to form a binder-containing photocatalyst film on the entire one surface of the slide glass. When adhesion of the coat was examined, the state of the coat was rated BC.

Example 4

Zirconium oxalate sol (0.114 g, having a concentration of 11.2% by weight in terms of $ZrO_2$) obtained in Example 2 was dispersed in 0.713 g of water and 0.322 g of a dispersion liquid of amorphous Zr—O-based particles (produced by Daiichi Kigenso Kagaku Kogyo Co., Ltd. under the trade name of ZSL-10T, having a concentration of 10.5% by weight in terms of $ZrO_2$) was added thereto. Next, 0.052 g of high-purity ethyl ortho-silicate (produced by Tama Chemicals Co., Ltd.) was added thereto. To the binder thus obtained, 4.8 g of the above photocatalyst dispersion liquid (having a concentration of 5% by weight) of Example 3 was added to obtain a photocatalyst coating liquid. With respect to the total amount of the titanium oxide photocatalyst particles and the tungsten oxide photocatalyst particles, the amounts of zirconium oxalate compound, amorphous Zr—O-based particles and ethyl silicate were respectively 0.053 mass times, 0.14 mass times and 0.063 mass times, in terms of the oxide.

Using the photocatalyst coating liquid obtained above, a binder-containing photocatalyst film was formed on the entire one surface of the slide glass by a similar process to that of Example 3. When adhesion of the coat was examined, the state of the coat was rated BC.

Example 5

Zirconium oxalate sol (0.201 g, having a concentration of 11.2% by weight in terms of $ZrO_2$) obtained in Example 2 was dispersed in 0.824 g of water and 0.072 g of a dispersion liquid of amorphous Zr—O-based particles (produced by Daiichi Kigenso Kagaku Kogyo Co., Ltd. under the trade name of ZSL-10T, having a concentration of 10.5% by weight in terms of $ZrO_2$) was added thereto. Next, 0.104 g of high-purity ethyl ortho-silicate (produced by Tama Chemicals Co., Ltd.) was added thereto. To the binder thus obtained, 4.8 g of the above photocatalyst dispersion liquid (having a concentration of 5% by weight) of Example 3 was added to obtain a photocatalyst coating liquid. With respect to the total amount of the titanium oxide photocatalyst particles and the tungsten oxide photocatalyst particles, the amounts of zirconium oxalate compound, amorphous Zr—O-based particles and ethyl silicate were respectively 0.094 mass times, 0.032 mass times and 0.13 mass times, in terms of the oxide.

Using the photocatalyst coating liquid obtained above, a binder-containing photocatalyst film was formed on the entire one surface of the slide glass by a similar process to that of Example 3. When adhesion of the coat was examined, the state of the coat was rated C.

Example 6

Zirconium oxalate sol (0.227 g, having a concentration of 11.2% by weight in terms of $ZrO_2$) obtained in Example 2 was dispersed in 0.706 g of water and 0.215 g of a dispersion liquid of amorphous Zr—O-based particles (produced by Daiichi Kigenso Kagaku Kogyo Co., Ltd. under the trade name of ZSL-10T, having a concentration of 10.5% by weight in terms of $ZrO_2$) was added thereto. Next, 0.052 g of high-purity ethyl ortho-silicate (produced by Tama Chemicals Co., Ltd.) was added thereto. To the binder thus obtained, 4.8 g of the above photocatalyst dispersion liquid (having a concentration of 5% by weight) of Example 3 was added to obtain a photocatalyst coating liquid. With respect to the total amount of the titanium oxide photocatalyst particles and the tungsten oxide photocatalyst particles, the amounts of zirconium oxalate compound, amorphous Zr—O-based particles and ethyl silicate were respectively 0.106 mass times, 0.094 mass times and 0.063 mass times, in terms of the oxide.

Using the photocatalyst coating liquid obtained above, a binder-containing photocatalyst film was formed on the entire one surface of the slide glass by a similar process to that of Example 3. When adhesion of the coat was examined, the state of the coat was rated BC.

Reference Example 3

Preparing of Titanium Oxide Photocatalyst Particles and its Dispersion Liquid

Ammonium dihydrogen phosphate (20.7 g, Wako analytical grade reagent) was dissolved in 5.39 kg of water and the obtained ammonium dihydrogen phosphate aqueous solution was mixed with 1.49 kg of a solid body (cake) (containing a solid part of 46.2% by mass in terms of $TiO_2$) of meta-titanic acid obtained by hydrolyzing titanyl sulfate with heating. The amount of ammonium dihydrogen phosphate was 0.02 mol with respect to 1 mol of meta-titanic acid. A titanium oxide particle dispersion liquid was obtained by subjecting the mixture to a dispersing treatment under the following conditions using a medium stirring type dispersing device ("ULTRA APEX MILL UAM-1" produced by Kotobuki Engineering & Manufacturing Co., Ltd.).
  Dispersion medium: 1.85 kg beads made of zirconia having an outer diameter of 0.05 mm
  Stirring rate: 8.1 m/sec. at a circumferential speed
  Flowing rate: 0.25 L/min
  Treating temperature: 20° C.
  Treating time: A total of about 76 minutes The average dispersed particle diameter of the titanium oxide particles in the obtained titanium oxide particle dispersion liquid was 96 nm and the dispersion liquid has a pH value of 8.2. A solid part was obtained by vacuum-drying a part of this dispersion liquid, and the BET specific surface area of the obtained solid part was 330 $m^2$/g. In addition, a solid part was obtained by vacuum-drying the mixture before the dispersing treatment similarly, and when the X-ray diffraction spectra of the solid part of the mixture before the dispersing treatment and the solid part of the titanium oxide photocatalyst dispersion liquid after the dispersing treatment were measured and compared, both the crystal structures were anatase, and the change of the crystal structure due to the dispersing treatment was not observed. When the dispersion liquid was stored at 20° C. for 12 hours, a solid-liquid separation was not observed during the storage.

Reference Example 4

Preparing of Tungsten Oxide Photocatalyst Particles and its Dispersion Liquid

A mixture was obtained by adding 1 kg of tungsten oxide powders (produced by NIPPON INORGANIC COLOUR & CHEMICAL CO., LTD.) serving as a particle-like photocatalyst to 4 kg of ion-exchanged water, followed by mixing. A tungsten oxide particle dispersion liquid was obtained by subjecting the mixture to a dispersing treatment under the following conditions using a medium stirring type dispersing device ("ULTRA APEX MILL UAM-1" produced by Kotobuki Engineering & Manufacturing Co., Ltd.).
  Dispersion medium: 1.85 kg beads made of zirconia having an outer diameter of 0.05 mm
  Stirring rate: 12.6 m/sec. at a circumferential speed
  Flowing rate: 0.25 L/min
  Treating time: A total of about 50 minutes The average dispersed particle diameter of the tungsten oxide particles in the tungsten oxide particle dispersion liquid was 118 nm. A solid part was obtained by vacuum-drying a part of this dispersion liquid, and the BET specific surface area of this solid part was 40 $m^2$/g. In addition, a solid part was obtained by vacuum-drying the mixture before the dispersing treatment similarly, and when the X-ray diffraction spectra of the solid part of the mixture before the dispersing treatment and the solid part of the tungsten oxide photocatalyst dispersion liquid after the dispersing treatment were measured and compared, both the crystal structures were $WO_3$, and the change of the crystal structure due to the dispersing treatment was not observed. When the dispersion liquid was stored at 20° C. for 3 hours, a solid-liquid separation was not observed during the storage.

Reference Example 5

Preparing of Amorphous Zr—O-Based Particles

A reaction dispersion liquid was prepared by dispersing 300 g of zirconium hydroxide [containing 30% by weight in terms of $ZrO_2$] in 1,070 g of pure water and adding 126 g of 67.5% by weight nitric acid thereto while properly stirring. The zirconium concentration of the reaction dispersion liquid was 6% by weight in terms of $ZrO_2$ and the gram equivalent of nitric acid ($HNO_3$) with respect to 1 mol of Zr was 1.85. Next, an amorphous sol was obtained by heating the dispersion liquid to 95° C. and maintaining for 24 hours, followed by standing and further natural cooling. Furthermore, a sol having a zirconium concentration of 10% by weight in terms of $ZrO_2$, a pH value of 3.2 and a gram equivalent of nitric acid ($HNO_3$) with respect to 1 mol of Zr measured by a Kjeldahl method of 0.4 was obtained by removing nitric acid in the sol through an ultrafiltration treatment of the sol and concentrating the zirconium concentration. When the particle size distribution of the sol was measured, the particle diameter D50 of the sol was 15 nm. When the sol was dried to the constant weight at 100° C., the X-ray diffraction pattern did not assign to a specific crystal system.

A basic sol was obtained by adding 64 g of citric anhydride to 1,000 g of a sol comprising the above amorphous Zr—O-based particles as a dispersoid and adding 120 g of 25% by weight ammonia water. Furthermore, a sol having a zirconium concentration of 15% by weight in terms of $ZrO_2$ and a pH value of 8.6 was obtained by repeating the operation of adding water to the sol and purifying and concentrating the sol through an ultrafiltration treatment.

The particle size distribution of the sol was nearly the same as that of the sol comprising the above amorphous Zr—O-based particles as a dispersoid and the particle diameter D50 was 12 nm. When the sol was dried to the constant weight at 100° C., the X-ray diffraction pattern was nearly the same as that of the sol comprising the above amorphous Zr—O-based particles as a dispersoid and did not assign to a specific crystal system.

Example 7

Preparing of Photocatalyst Dispersion Liquid

The titanium oxide photocatalyst dispersion liquid obtained in Reference Example 3 and the tungsten oxide photocatalyst dispersion liquid obtained in Reference Example 4 were mixed so that the use amount ratio of the titanium oxide photocatalyst particles to the tungsten oxide photocatalyst particles was to be 1:1 (at mass ratio) and the total amount of the titanium oxide photocatalyst particles and the tungsten oxide photocatalyst particles was to be 5% by weight with respect to the dispersion liquid. In this case, ethanol was added so that the concentration in the dispersion liquid was to be 40% by weight. A solid-liquid separation was not observed in this photocatalyst dispersion liquid.

[Preparing of Photocatalyst Coating Liquid]

Zirconium oxalate sol (0.072 g, having a concentration of 12.5% by weight in terms of $ZrO_2$) obtained in Example 1 was dispersed in a mixed liquid of 0.0074 g of an oxalic acid dihydrate aqueous solution (5% by weight of oxalic acid dihydrate) and 0.604 g of water, and then 0.185 g of a dispersion liquid of amorphous Zr—O-based particles in Reference Example 5 (having a concentration of 14.6% by weight in terms of $ZrO_2$) was added. Next, 0.031 g of high-purity ethyl ortho-silicate (produced by Tama Chemicals Co., Ltd.) was added. To the binder thus obtained, 2.1 g of the above photocatalyst dispersion liquid (having a concentration of 5% by weight) was added to obtain a photocatalyst coating liquid. With respect to the total amount of the titanium oxide photocatalyst particles and the tungsten oxide photocatalyst particles, the amounts of zirconium oxalate compound, amorphous Zr—O-based particles and ethyl silicate were respectively 0.086 mass times, 0.257 mass times and 0.086 mass times, in terms of the oxide.

The photocatalyst coating liquid obtained above was coated on a sufficiently degreased slide glass and the excess dispersion liquid was removed by rotating at 1,000 rpm for 10 seconds, then at 3,000 rpm for 10 seconds using a spin coater (produced by Mikasa Co., Ltd. under the trade name of "1H-D7"). This glass plate was dried at 110° C. to form a binder-containing photocatalyst film on the entire one surface of the slide glass. When adhesion of the coat was examined, the state of the coat was rated C.

Comparative Example 1

A photocatalyst dispersion liquid was prepared by a similar process to that of Example 3 except using a commercial titanium oxide dispersion liquid ("STS-01", produced by Ishihara Sangyo Kaisha Ltd., containing nitric acid, and having an average dispersed particle diameter of 50 nm) instead of the titanium oxide photocatalyst dispersion liquid obtained in Reference Example 1. A total amount of the titanium oxide photocatalyst particles and the tungsten oxide photocatalyst particles in 100 parts by mass of the photocatalyst dispersion liquid was 5 parts by mass. During the storage of this photocatalyst dispersion liquid, aggregated particles were produced and a solid-liquid separation generated. The zeta potential of the titanium oxide particles in the titanium oxide dispersion liquid [STS-01] was +40.1 mV.

A photocatalyst coating liquid was prepared by a similar process to that of Example 3 except using the obtained photocatalyst dispersion liquid. With respect to the total amount of the titanium oxide photocatalyst particles and the tungsten oxide photocatalyst particles, the amounts of zirconium oxalate compound, amorphous Zr—O-based particles and ethyl silicate were respectively 0.031 mass times, 0.094 mass times and 0.13 mass times, in terms of the oxide.

A binder-containing photocatalyst film was formed on the entire one surface of the slide glass by a similar process to that of Example 3 using the photocatalyst coating liquid obtained above. When adhesion of the coat was examined, the state of the coat was rated E.

Comparative Example 2

A photocatalyst dispersion liquid was prepared by a similar process to that of Example 3 except using a commercial titanium oxide dispersion liquid ("STS-01", produced by Ishihara Sangyo Kaisha Ltd., containing nitric acid, and having an average dispersed particle diameter of 50 nm) instead of the titanium oxide photocatalyst dispersion liquid obtained in Reference Example 1. A total amount of the titanium oxide photocatalyst particles and the tungsten oxide photocatalyst particles in 100 parts by mass of the photocatalyst dispersion liquid was 5 parts by mass. During the storage of this photocatalyst dispersion liquid, aggregated particles were produced and a solid-liquid separation generated.

A photocatalyst coating liquid was prepared by a similar process to that of Example 4 except using the obtained photocatalyst dispersion liquid. With respect to the total amount of the titanium oxide photocatalyst particles and the tungsten oxide photocatalyst particles, the amounts of zirconium oxalate compound, amorphous Zr—O-based particles and ethyl silicate were respectively 0.053 mass times, 0.14 mass times and 0.063 mass times, in terms of the oxide.

A binder-containing photocatalyst film was formed on the entire one surface of the slide glass by a similar process to that of Example 3 using the photocatalyst coating liquid obtained above. When adhesion of the coat was examined, the state of the coat was rated D.

Comparative Example 3

A photocatalyst dispersion liquid was prepared by a similar process to that of Example 3 except using a commercial titanium oxide dispersion liquid ("STS-01", produced by Ishihara Sangyo Kaisha Ltd., containing nitric acid, and having an average dispersed particle diameter of 50 nm) instead of the titanium oxide dispersion liquid obtained in Reference Example 1. A total amount of the titanium oxide photocatalyst particles and the tungsten oxide photocatalyst particles in 100 parts by mass of the photocatalyst dispersion liquid was 5 parts by mass. During the storage of this photocatalyst dispersion liquid, aggregated particles were produced and a solid-liquid separation generated.

A photocatalyst coating liquid was prepared by a similar process to that of Example 5 except using the obtained photocatalyst dispersion liquid. With respect to the total amount of the titanium oxide photocatalyst particles and the tungsten oxide photocatalyst particles, the amounts of zirconium oxalate compound, amorphous Zr—O-based particles and ethyl silicate were respectively 0.094 mass times, 0.032 mass times and 0.13 mass times, in terms of the oxide.

A binder-containing photocatalyst film was formed on the entire one surface of the slide glass by a similar process to that of Example 3 using the photocatalyst coating liquid obtained above. When adhesion of the coat was examined, the state of the coat was rated E.

Comparative Example 4

A photocatalyst dispersion liquid was prepared by a similar process to that of Example 3 except using a commercial titanium oxide dispersion liquid ("STS-01", produced by Ishihara Sangyo Kaisha Ltd., containing nitric acid, and having an average dispersed particle diameter of 50 nm) instead of the titanium oxide photocatalyst dispersion liquid obtained in Reference Example 1. A total amount of the titanium oxide photocatalyst particles and the tungsten oxide photocatalyst particles in 100 parts by mass of the photocatalyst dispersion liquid was 5 parts by mass. During the storage of this photocatalyst dispersion liquid, aggregated particles were produced and a solid-liquid separation generated.

A photocatalyst coating liquid was prepared by a similar process to that of Example 6 except using the obtained photocatalyst dispersion liquid. With respect to the total amount of the titanium oxide photocatalyst particles and the tungsten oxide photocatalyst particles, the amounts of zirconium oxalate compound, amorphous Zr—O-based particles and ethyl silicate were respectively 0.106 mass times, 0.094 mass times and 0.063 mass times, in terms of the oxide.

A binder-containing photocatalyst film was formed on the entire one surface of the slide glass by a similar process to that of Example 3 using the photocatalyst coating liquid obtained above. When adhesion of the coat was examined, the state of the coat was rated E.

Comparative Example 5

A binder was obtained by adding 0.286 g of a dispersion liquid of amorphous Zr—O-based particles (produced by Daiichi Kigenso Kagaku Kogyo Co., Ltd. under the trade name of ZSL-10T, having a concentration of 10.5% by weight in terms of $ZrO_2$) to 0.810 g of water and also adding 0.104 g of high-purity ethyl ortho-silicate (produced by Tama Chemicals Co., Ltd.). To the binder thus obtained, 4.8 g of the above photocatalyst dispersion liquid (having a concentration of 5% by weight) of Example 3 was added to obtain a photocatalyst coating liquid. With respect to the total amount of the titanium oxide photocatalyst particles and the tungsten oxide photocatalyst particles, the amounts of amorphous Zr—O-based particles and ethyl silicate were respectively 0.13 mass times and 0.13 mass times, in terms of the oxide.

A binder-containing photocatalyst film was formed on the entire one surface of the slide glass by a similar process to that of Example 3 using the photocatalyst coating liquid obtained above. When adhesion of the coat was examined, the state of the coat was rated D.

Comparative Example 6

Zirconium oxalate sol (0.033 g, having a concentration of 11.2% by weight in terms of $ZrO_2$) obtained in Example 2 was dispersed in 0.903 g of water and 0.107 g of a dispersion liquid of amorphous Zr—O-based particles (produced by Daiichi Kigenso Kagaku Kogyo Co., Ltd. under the trade name of ZSL-10T, having a concentration of 10.5% by weight in terms of $ZrO_2$) was added. Next, 0.156 g of high-purity ethyl ortho-silicate (produced by Tama Chemicals Co., Ltd.) was added. To the binder thus obtained, 4.8 g of the above photocatalyst dispersion liquid (having a concentration of 5% by weight) of Example 3 was added to obtain a photocatalyst coating liquid. With respect to the total amount of the titanium oxide photocatalyst particles and the tungsten oxide photocatalyst particles, the amounts of zirconium oxalate compound, amorphous Zr—O-based particles and ethyl silicate were respectively 0.015 mass times, 0.047 mass times and 0.19 mass times, in terms of the oxide.

A binder-containing photocatalyst film was formed on the entire one surface of the slide glass by a similar process to that of Example 3 using the photocatalyst coating liquid obtained above. When adhesion of the coat was examined, the state of the coat was rated BC.

Comparative Example 7

Zirconium oxalate sol (0.101 g, having a concentration of 11.2% by weight in terms of $ZrO_2$) obtained in Example 2 was dispersed in 0.908 g of water and 0.0357 g of a dispersion liquid of amorphous Zr—O-based particles (produced by Daiichi Kigenso Kagaku Kogyo Co., Ltd. under the trade name of ZSL-10T, having a concentration of 10.5% by weight in terms of $ZrO_2$) was added. Next, 0.156 g of high-purity ethyl ortho-silicate (produced by Tama Chemicals Co., Ltd.) was added. To the binder thus obtained, 4.8 g of the above photocatalyst dispersion liquid (having a concentration of 5% by weight) of Example 3 was added to obtain a photocatalyst coating liquid. With respect to the total amount of the titanium oxide photocatalyst particles and the tungsten oxide photocatalyst particles, the amounts of zirconium oxalate compound, amorphous Zr—O-based particles and ethyl silicate were respectively 0.047 mass times, 0.016 mass times and 0.19 mass times, in terms of the oxide.

A binder-containing photocatalyst film was formed on the entire one surface of the slide glass by a similar process to that of Example 3 using the photocatalyst coating liquid obtained above. When adhesion of the coat was examined, the state of the coat was rated C.

Comparative Example 8

Zirconium oxalate sol (0.268 g, having a concentration of 11.2% by weight in terms of $ZrO_2$) obtained in Example 2 was dispersed in 0.828 g of water and 0.104 g of high-purity ethyl ortho-silicate (produced by Tama Chemical Co., Ltd.) was added. To the binder thus obtained, 4.8 g of the above photocatalyst dispersion liquid (having a concentration of 5% by weight) of Example 3 was added to obtain a photocatalyst coating liquid. With respect to the total amount of the titanium oxide photocatalyst particles and the tungsten oxide photocatalyst particles, the amounts of zirconium oxalate compound and ethyl silicate were both 0.13 mass times in terms of the oxide.

A binder-containing photocatalyst film was formed on the entire one surface of the slide glass by a similar process to that of Example 3 using the photocatalyst coating liquid obtained above. When adhesion of the coat was examined, the state of the coat was rated D.

Comparative Example 9

Zirconium oxalate sol (0.268 g, having a concentration of 11.2% by weight in terms of $ZrO_2$) obtained in Example 2 was dispersed in 0.646 g of water and 0.286 g of a dispersion liquid of amorphous Zr—O-based particles (produced by Daiichi Kigenso Kagaku Kogyo Co., Ltd. under the trade name of ZSL-10T, having a concentration of 10.5% by weight in terms of $ZrO_2$) was added. To the binder thus obtained, 4.8 g of the above photocatalyst dispersion liquid (having a concentration of 5% by weight) of Example 3 was added to obtain a photocatalyst coating liquid. With respect to the total amount of the titanium oxide photocatalyst particles and the tungsten oxide photocatalyst particles, the amounts of zirconium oxalate compound and amorphous Zr—O-based particles were both 0.13 mass times, in terms of the oxide.

A binder-containing photocatalyst film was formed on the entire one surface of the slide glass by a similar process to that of Example 3 using the photocatalyst coating liquid obtained above. When adhesion of the coat was examined, the state of the coat was rated E.

Comparative Example 10

A photocatalyst dispersion liquid was prepared by a similar process to that of Example 7 except using a commercial titanium oxide dispersion liquid ("STS-01", produced by Ishihara Sangyo Kaisha Ltd., containing nitric acid, and having an average dispersed particle diameter of 50 nm) instead of the titanium oxide photocatalyst dispersion liquid obtained in Reference Example 1. A total amount of the titanium oxide photocatalyst particles and the tungsten oxide photocatalyst particles in 100 parts by mass of the photocatalyst dispersion liquid was 5 parts by mass. During the storage of this photocatalyst dispersion liquid, aggregated particles were produced and a solid-liquid separation generated.

A photocatalyst coating liquid was prepared by a similar process to that of Example 7 except using the obtained photocatalyst dispersion liquid. With respect to the total amount of the titanium oxide photocatalyst particles and the tungsten oxide photocatalyst particles, the amounts of zirconium oxalate compound, amorphous Zr—O-based particles and ethyl silicate were respectively 0.086 mass times, 0.257 mass times and 0.086 mass times, in terms of the oxide.

A binder-containing photocatalyst film was formed on the entire one surface of the slide glass by a similar process to that of Example 7 using the photocatalyst coating liquid obtained above. When adhesion of the coat was examined, the state of the coat was rated D.

Example 8

Using the photocatalyst coating liquids of Examples 3 to 7 and Comparative Examples 6 to 7 in which adhesion of the coat was rated BC or C, a photocatalytic activity was evaluated and the results shown in Table 1 were obtained.

TABLE 1

| | First-order rate constant ($h^{-1}$) |
|---|---|
| Example 3 | 0.186 |
| Example 4 | 0.307 |
| Example 5 | 0.200 |
| Example 6 | 0.257 |
| Example 7 | 0.244 |
| Comparative Example 6 | 0.129 |
| Comparative Example 7 | 0.058 |

Example 9

When each photocatalyst coating liquid obtained in Examples 3 to 7 was coated and dried on a ceiling material, the volatile organic substance concentration of toluene, formaldehyde, acetaldehyde, or the like and the concentration of a malodorous substance could be reduced by the light irradiation from an interior lighting, and pathogenic bacteria such as *staphylococcus aureus, coliform bacillus*, or the like could be killed.

Example 10

When each photocatalyst coating liquid obtained in Examples 3 to 7 coated and dried on a tile, the volatile organic substance concentration of toluene, formaldehyde, acetaldehyde, or the like and the concentration of a malodorous substance could be reduced by the light irradiation from an interior lighting, and pathogenic bacteria such as *staphylococcus aureus, coliform bacillus*, or the like could be killed.

Example 11

When each photocatalyst coating liquid obtained in Examples 3 to 7 coated and dried on a glass, the volatile organic substance concentration of toluene, formaldehyde, acetaldehyde, or the like and the concentration of a malodorous substance could be reduced by the light irradiation from an interior lighting, and pathogenic bacteria such as *staphylococcus aureus, coliform bacillus*, or the like could be killed.

Example 12

When each photocatalyst coating liquid obtained in Examples 3 to 7 coated and dried on a wallpaper, the volatile organic substance concentration of toluene, formaldehyde, acetaldehyde, or the like and the concentration of a malodorous substance could be reduced by the light irradiation from an interior lighting, and pathogenic bacteria such as *staphylococcus aureus, coliform bacillus*, or the like could be killed.

Example 13

When each photocatalyst coating liquid obtained in Examples 3 to 7 coated and dried on a wall material, the volatile organic substance concentration of toluene, formaldehyde, acetaldehyde, or the like and the concentration of a malodorous substance could be reduced by the light irradiation from an interior lighting, and pathogenic bacteria such as *staphylococcus aureus, coliform bacillus*, or the like could be killed.

Example 14

When each photocatalyst coating liquid obtained in Examples 3 to 7 coated and dried on a floor, the volatile organic substance concentration of toluene, formaldehyde, acetaldehyde, or the like and the concentration of a malodorous substance could be reduced by the light irradiation from an interior lighting, and pathogenic bacteria such as *staphylococcus aureus, coliform bacillus*, or the like could be killed.

Example 15

When each photocatalyst coating liquid obtained in Examples 3 to 7 coated and dried on surfaces of automobile upholsteries such as an automobile instrument panel, an automobile sheet, an automobile ceiling material, and the like, the volatile organic substance concentration of toluene, formaldehyde, acetaldehyde, or the like and the concentration of a malodorous substance could be reduced by the light irradiation from an interior lighting, and pathogenic bacteria such as *staphylococcus aureus, coliform bacillus*, or the like could be killed.

As this description may be embodied in several forms without departing from the spirit of essential characteristics thereof, the present embodiment is therefore illustrative and not restrictive, since the scope is defined by the appended claims rather than by the description preceding them, and all changes that fall within metes and bounds of the claims, or equivalence of such metes and bounds thereof are therefore intended to be embraced by the claims.

What is claimed is:

1. A zirconium oxalate sol as a dispersoid, wherein
    a mol ratio of oxalic acid to Zr (oxalic acid/Zr) is from 1.2 to 3, and
    a particle diameter D50 of the dispersoid is from 10 nm to 100 nm.

2. A process for producing the sol according to claim 1, comprising adding oxalic acid to a dispersion liquid of zirconium hydroxide in twice.

3. A process for producing the sol according to claim 1, comprising: a first adding step of adding oxalic acid to the dispersion liquid of zirconium hydroxide so that a mole ratio of oxalic acid to Zr (oxalic acid/Zr) is to be from 0.8 to 1.0:
- a first heating step of heating the obtained mixture of zirconium hydroxide and oxalic acid after the first adding step;
- a second adding step of further adding oxalic acid so that the mole ratio of oxalic acid to Zr (oxalic acid/Zr) is to be from 1.2 to 3.0, after the first heating step; and
- a second heating step of heating the mixture again after the second adding step.

* * * * *